US008390275B2

(12) United States Patent
Inoue et al.

(10) Patent No.: US 8,390,275 B2
(45) Date of Patent: Mar. 5, 2013

(54) COMPONENT INCLUDING MAGNETS FOR INPUT OPERATION

(75) Inventors: Hiroto Inoue, Kyoto (JP); Tamotsu Yamamoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 76 days.

(21) Appl. No.: 12/062,992

(22) Filed: Apr. 4, 2008

(65) Prior Publication Data

US 2008/0297146 A1 Dec. 4, 2008

(30) Foreign Application Priority Data

Apr. 10, 2007 (JP) ................................ 2007-102433

(51) Int. Cl.
*G01B 7/30* (2006.01)

(52) U.S. Cl. .................... 324/207.25; 345/158; 345/184

(58) Field of Classification Search .................... 341/32, 341/35; 345/158; 324/207.25
See application file for complete search history.

(56) References Cited

U.S. PATENT DOCUMENTS

| | | | | |
|---|---|---|---|---|
| 6,518,749 | B1 | 2/2003 | Oudet et al. | |
| 7,202,659 | B2 * | 4/2007 | Ushihara et al. | 324/207.25 |
| 2005/0189203 | A1 * | 9/2005 | Kodani et al. | 200/14 |
| 2007/0202935 | A1 * | 8/2007 | Won et al. | 455/575.4 |
| 2007/0210828 | A1 * | 9/2007 | Won et al. | 326/41 |

FOREIGN PATENT DOCUMENTS

| | | | |
|---|---|---|---|
| JP | 49-076265 | | 7/1974 |
| JP | 04-055727 | U | 5/1992 |
| JP | 2003-092047 | A | 3/2003 |
| JP | 2005-174807 | A | 6/2005 |
| JP | 2005-302654 | A | 10/2005 |
| JP | 2005-302655 | A | 10/2005 |
| KR | 2001-0013445 | A | 2/2001 |

OTHER PUBLICATIONS

European Search Report for EP 08 15 4253, Mar. 17, 2010, Panasonic Corp.

* cited by examiner

*Primary Examiner* — Patrick Assouad
*Assistant Examiner* — David M. Schindler
(74) *Attorney, Agent, or Firm* — RatnerPrestia

(57) ABSTRACT

A left-side ring magnet and a right-side ring magnet are fastened to a roller-shaped operation part, circumferentially displaced from each other by a certain angle. Magnetic variation generated by rotation of the magnets is detected by a magnetism detection element. Additionally, a left-side stationary magnet and a right-side stationary magnet, with the same magnetic pole, are annexed correspondingly to the left-side ring magnet and the right-side ring magnet, respectively, so that the stationary magnets are arranged with the same proximal arrangement relative to the ring magnets, respectively. With such a structure, two attractive and repulsive forces between the left-side ring magnet and the left-side stationary magnet; and between the right-side ring magnet and the right-side stationary magnet are totally exerted on the operation part, thereby providing a sharp, clear click touch during rotation.

2 Claims, 14 Drawing Sheets

COMPONENT INCLUDING MAGNETS FOR INPUT OPERATION

TECHNICAL FIELD

The present invention relates to a component for input operation incorporated into a unit for input operation of various types of electronic devices, allowing desired input by operating a roller-shaped operation part.

BACKGROUND ART

Among electronic components for input operation incorporated into various types of electronic devices, those equipped with a roller-shaped operation part have been widely used.

Hereinafter, a description is made for such a conventional component for input operation.

FIG. 12 is a sectional elevational view of a conventional component for input operation. FIG. 13 is an exploded perspective view of the component. FIG. 14 is a side sectional view of the same.

In FIGS. 12 through 14, operation part 1 is formed into a roller shape with its outside shape roughly cylindrical. The central hole of operation part 1 has central axis 2 bonded thereto. Both ends of central axis 2 protrude laterally from the round side of operation part 1. Both protrusions of central axis 2 are respectively inserted into the holes provided in the side wall of attaching member 3 and are rotatably retained. Attaching member 3 above-described is formed into a frame-like shape with two members coupled. Then, each end of above-described central axis 2 protruding outward from the above-described retaining part has ring magnet 5 (5A, 5B), formed into a cylindrical shape, fixed coaxially with operation part 1 through retainer 4.

Ring magnets 5A, 5B are identical to each other and are magnetized to north and south poles alternately at a given angular pitch. Then, ring magnets 5A, 5B are integrated with central axis 2 through retainer 4, circumferentially displaced from each other by a certain angle.

Detection elements 6A, 6B detect magnetic variation. They are respectively arranged on the inner surface of the side wall of base 7 formed into an open-topped U shape from the side view. Detection element 6A is arranged side by side with ring magnet 5A at a given spacing, aligned to the extended line of central axis 2, corresponding to above-described ring magnet 5A. Similarly, detection element 6B is arranged side by side with ring magnet 5B at a given spacing, aligned to the extended line of central axis 2, corresponding to above-described ring magnet 5B.

Frame-shaped attaching member 3 is rotatably retained by base 7. Base 7 is integrated with flexible wiring plate 9 equipped with press switch 8 activated when pressed by a protrusion provided on attaching member 3 when attaching member 3 rotates. Flexible wiring plate 9 has an extended part extended to the inner surface of the side wall of base 7. The extended part has detection elements 6A, 6B implemented thereon and a wiring part wired from press switch 8 and detection elements 6A, 6B provided.

Attaching member 3 further has elastic spring member 10 made of a leaf-spring member fixed thereto. The tip of the elastic arm of elastic spring member 10 elastically contacts the roughly central position of central axis 2 formed into a regular polygon in cross section.

A conventional component for input operation is structured as described above.

Next, a description is made for the operation of a conventional component for input operation.

First, exerting a tangential force on the outer circumferential surface of operation part 1 to rotate operation part 1 causes operation part 1 and central axis 2 bonded thereto to rotate. Consequently, ring magnets 5A, 5B at both ends integrated to central axis 2 rotate accordingly with each other. Magnetic variation generated according to the rotation is detected by corresponding detection elements 6A, 6B individually. At this moment, ring magnets 5A, 5B are fixed to central axis 2, displaced from each other by a certain angle, and thus pulse signals with a given phase difference are gained from detection elements 6A, 6B, thereby enabling rotation direction and rotation amount to be detected.

During the rotation of operation part 1, the tip of the elastic arm of elastic spring member 10 fixed to attaching member 3 elastically contacts the central part of central axis 2 formed into a regular polygon in cross section, including while central axis 2 is rotating, thus giving a certain click touch. Pressing down operation part 1 causes attaching member 3 retaining operation part 1 to rotate relatively to base 7, pressing press switch 8 arranged on base 7. The pressing generates a switching signal. Prior art documents related to the present invention include Japanese Patent Unexamined Publication No. 2005-302654.

However, a conventional component for input operation detects rotation of operation part 1 in a noncontact manner as its specification, while a click touch during rotating operation is gained by an elastic contact of elastic spring member 10 to central axis 2, thus reducing the rotation life. Further, when the central part of central axis 2 formed into a regular polygon in cross section 3 wears, a click touch given becomes dull.

SUMMARY OF THE INVENTION

The present invention provides a component for input operation that generates a click touch during the rotation operation of the operation part in a noncontact manner, a click touch sharp and clear.

In the present invention, two identical ring magnets are fixed to a roller-shaped operation part coaxially therewith. Magnetic variation generated by the rotation of the ring magnets according to the rotation of the operation part is detected by a magnetism detection element to enable detecting the rotation direction and the like. In addition, stationary magnets with the same magnetic pole are closely arranged correspondingly to an individual ring magnet, and attractive and repulsive forces generated between each pair of the ring magnets and the stationary magnets are totally applied to the operation part, thereby giving a click touch.

With this makeup, a rotating state of the roller-shaped operation part is detected in a noncontact manner, and the above-described two ring magnets provided for detecting a rotating state generate a sharp, clear click touch during rotation of the operation part in a noncontact manner.

REFERENCE MARKS IN THE DRAWINGS

Figure 1:
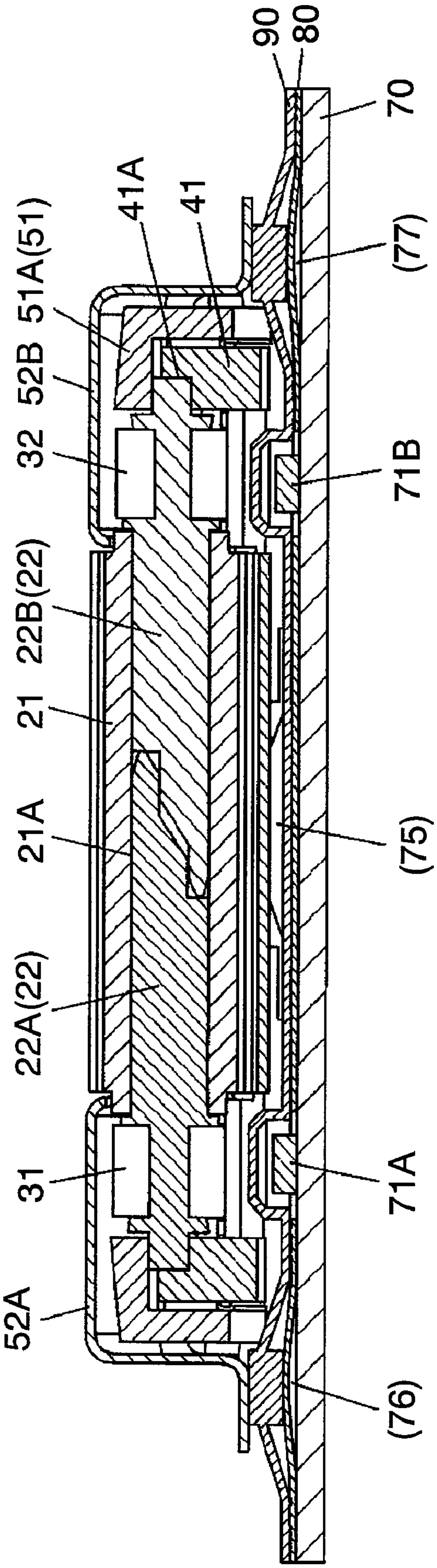
FIG. 1 is a sectional elevational view of a component for input operation according to the embodiment of the present invention.

21 Operation part
21A Through hole
22 Central axis
22A Left-side axis portion
22B Right-side axis portion
31 Left-side ring magnet
32 Right-side ring magnet
41 Attaching member
41A Recess
41B Rotation supporting point
45 Plate-like body
46 Left-side stationary magnet
47 Right-side stationary magnet
51 Base
51 Cover
51B Rotation retaining groove
52A, 52B Switch pressing member
70 Wiring substrate
71A, 71B Magnetism detection element
75, 76, 77 Press switch
75A, 76A, 77A Fixed contact
80 Insulating sheet
90 Rubber sheet

DETAILED DESCRIPTION OF PREFERRED EMBODIMENT

Exemplary Embodiment

Figure 2:
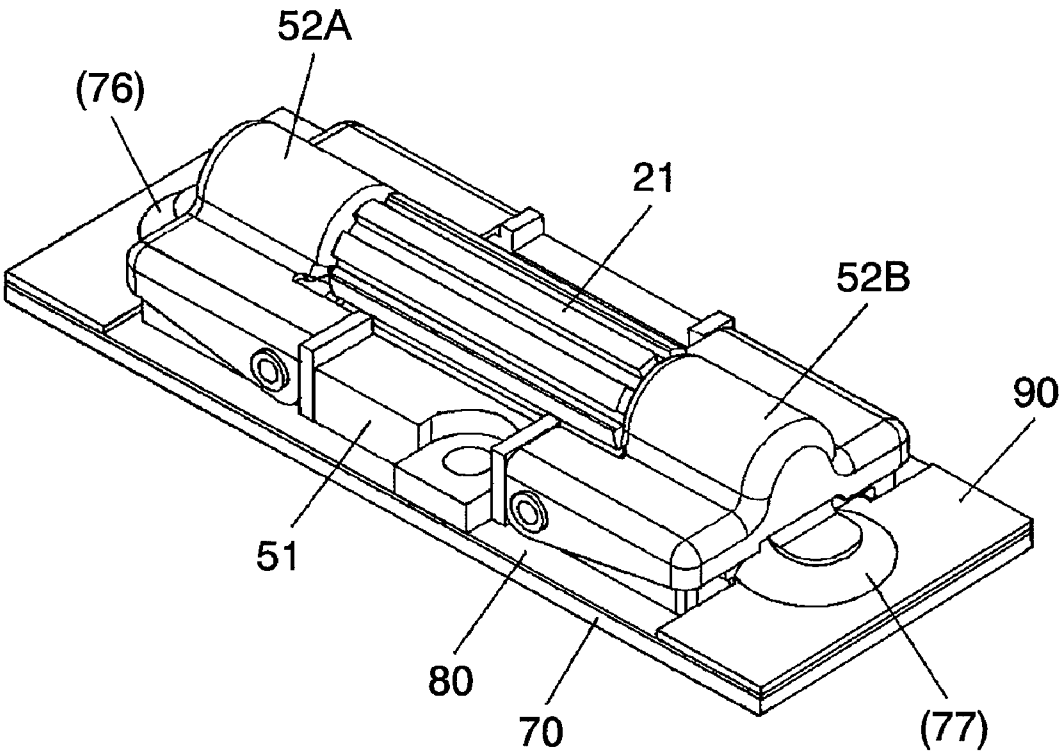
FIG. 2 is an external perspective view of the component for input operation according to the embodiment of the present invention.
Figure 3:
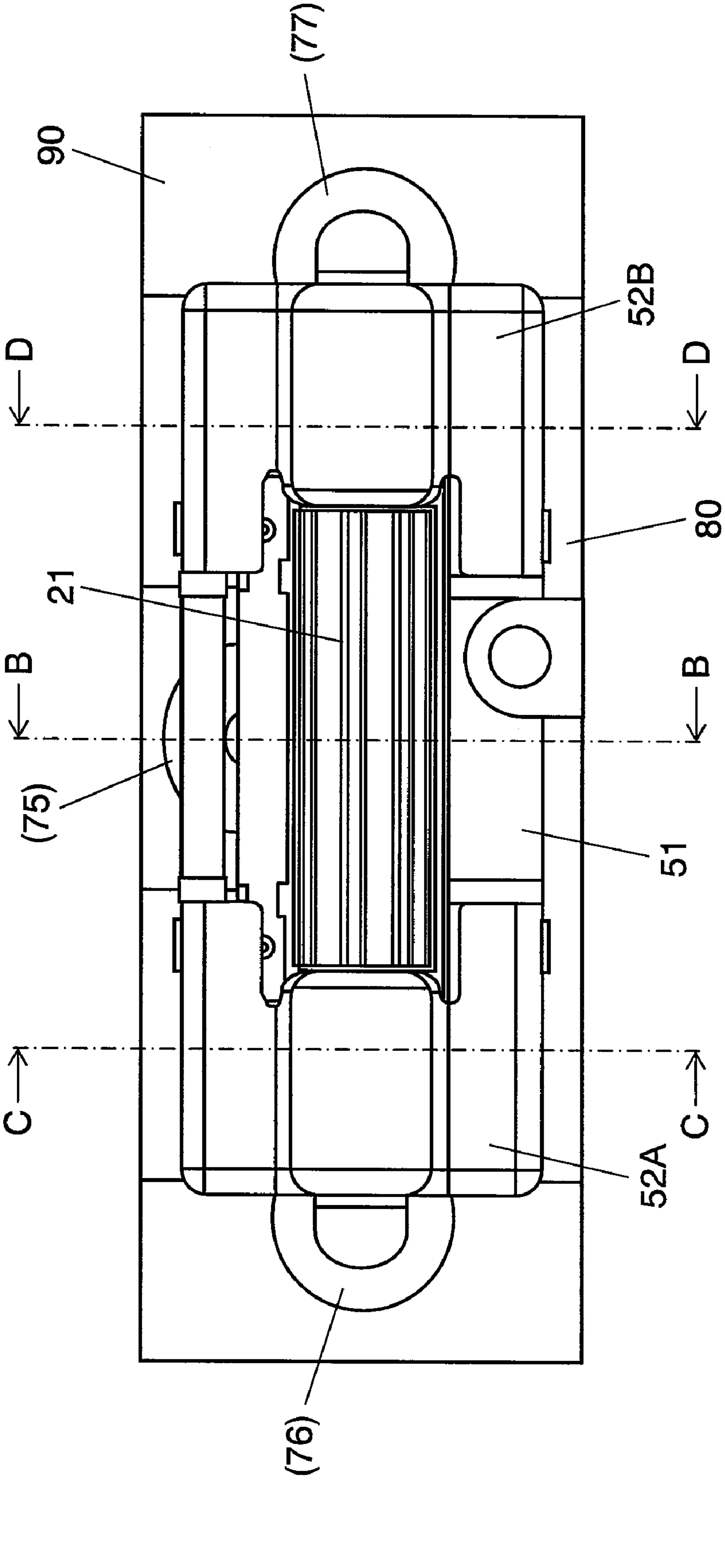
FIG. 3 is a top view of the same.
Figure 4:
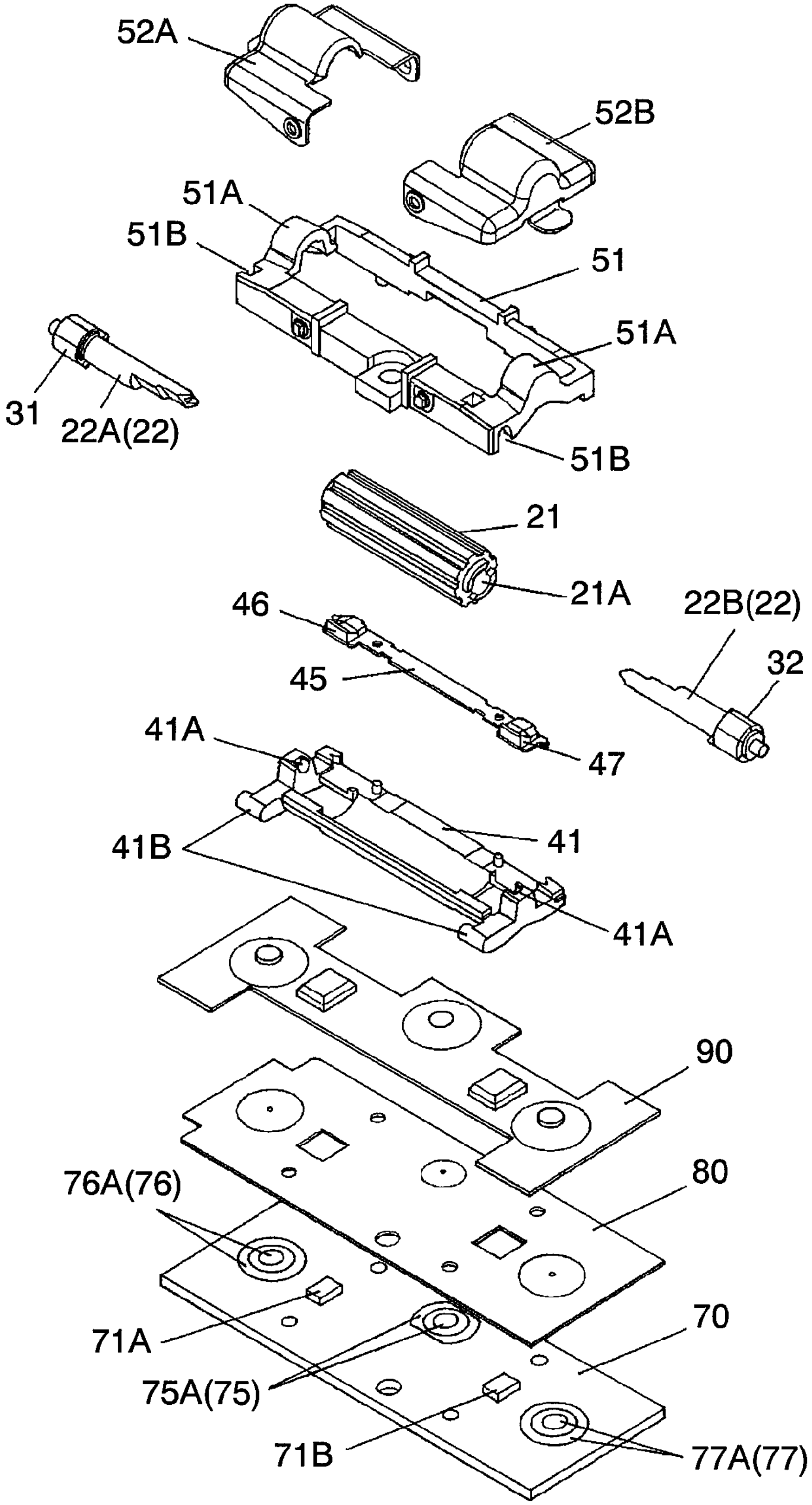
FIG. 4 is an exploded perspective view of the same.
Figure 5:
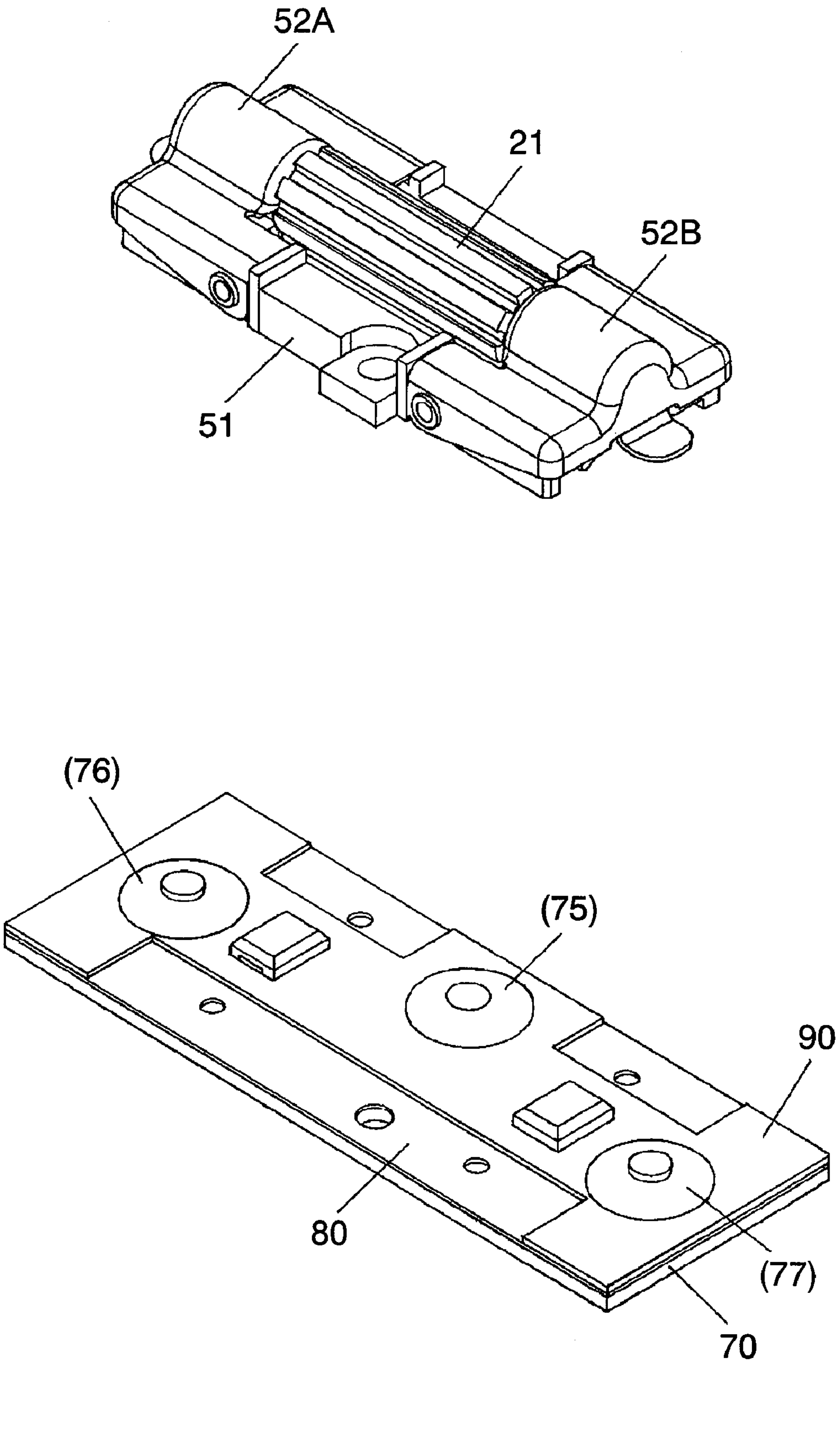
FIG. 5 is a perspective view of the same, before the mechanism composing position and wiring substrate composing position are assembled into the component.
Figure 6:
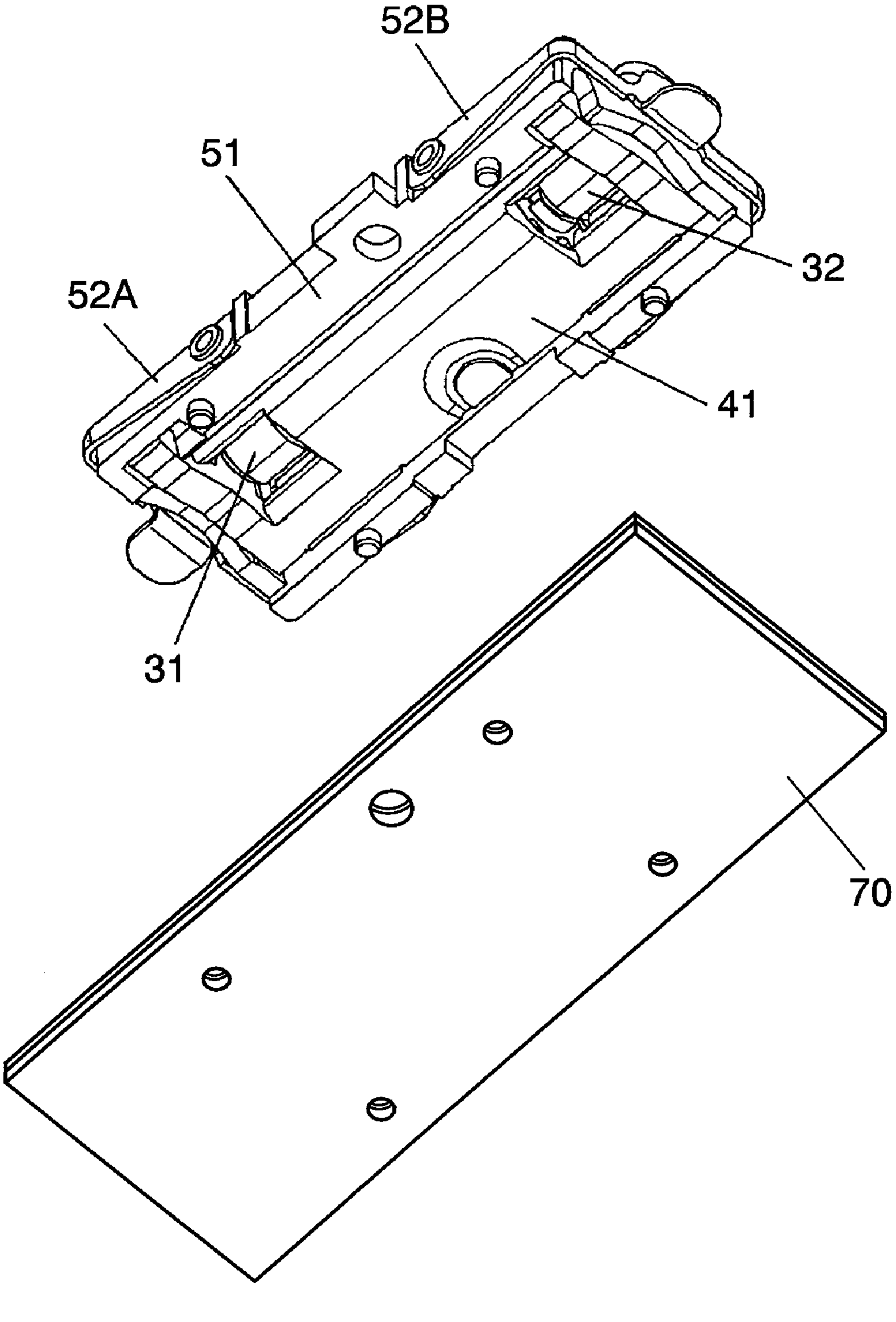
FIG. 6 is perspective view of the state of FIG. 5, viewed from the bottom.
Figure 7:
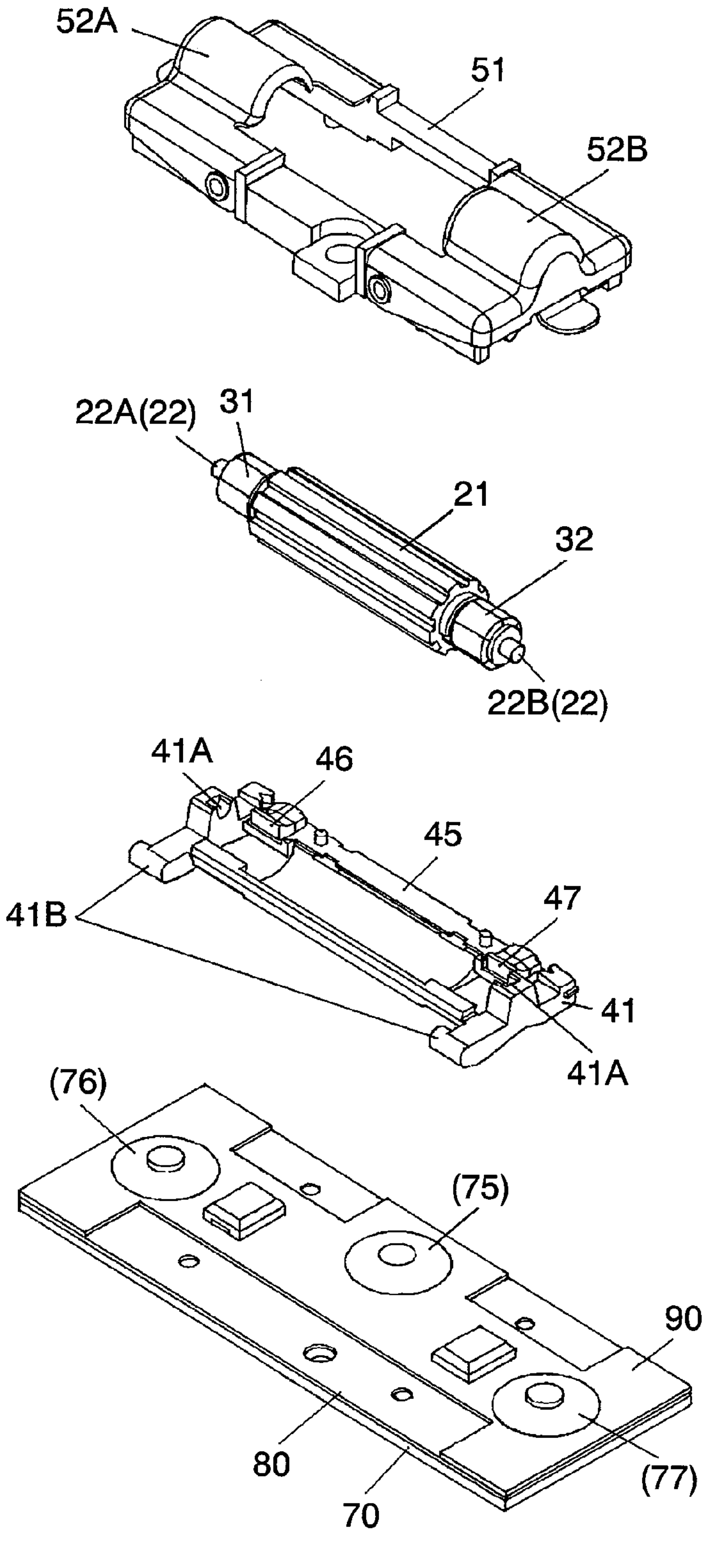
FIG. 7 is a perspective view illustrating the mechanism composing position of the same.
Figure 8:
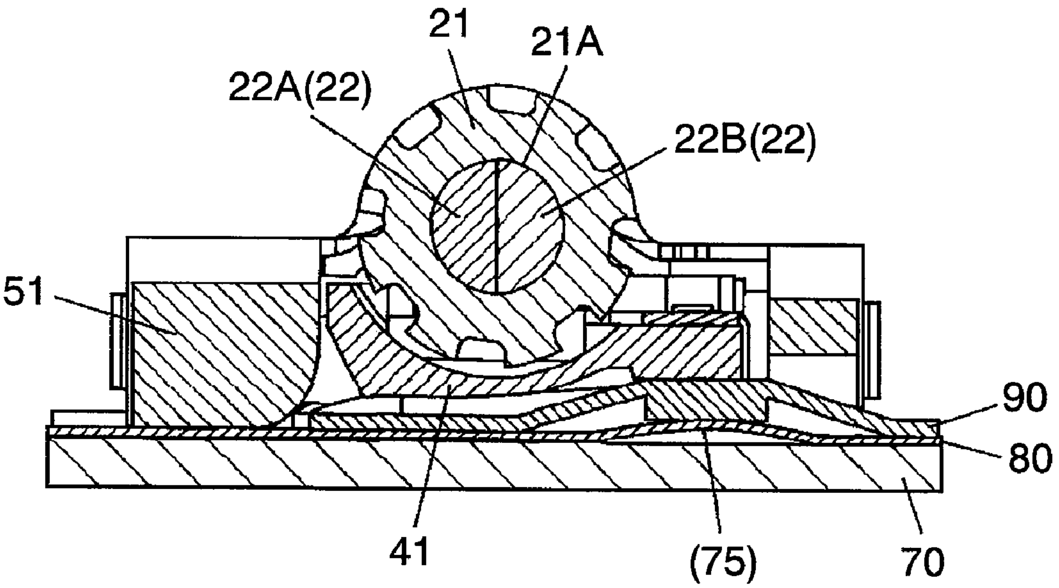
FIG. 8 is a side sectional view of the same in FIG. 3, taken along line B-B.
Figure 9:
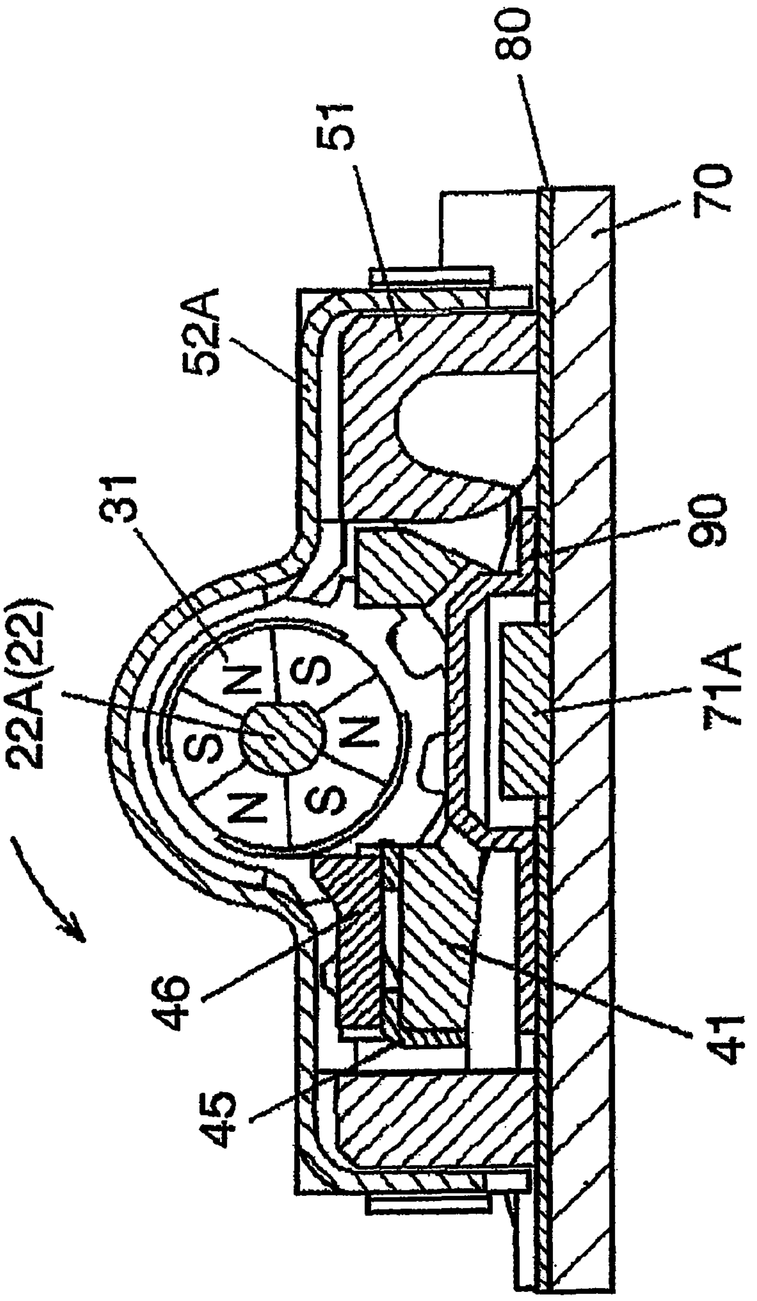
FIG. 9 is a side sectional view of the same in FIG. 3, taken along line C-C.
Figure 10:
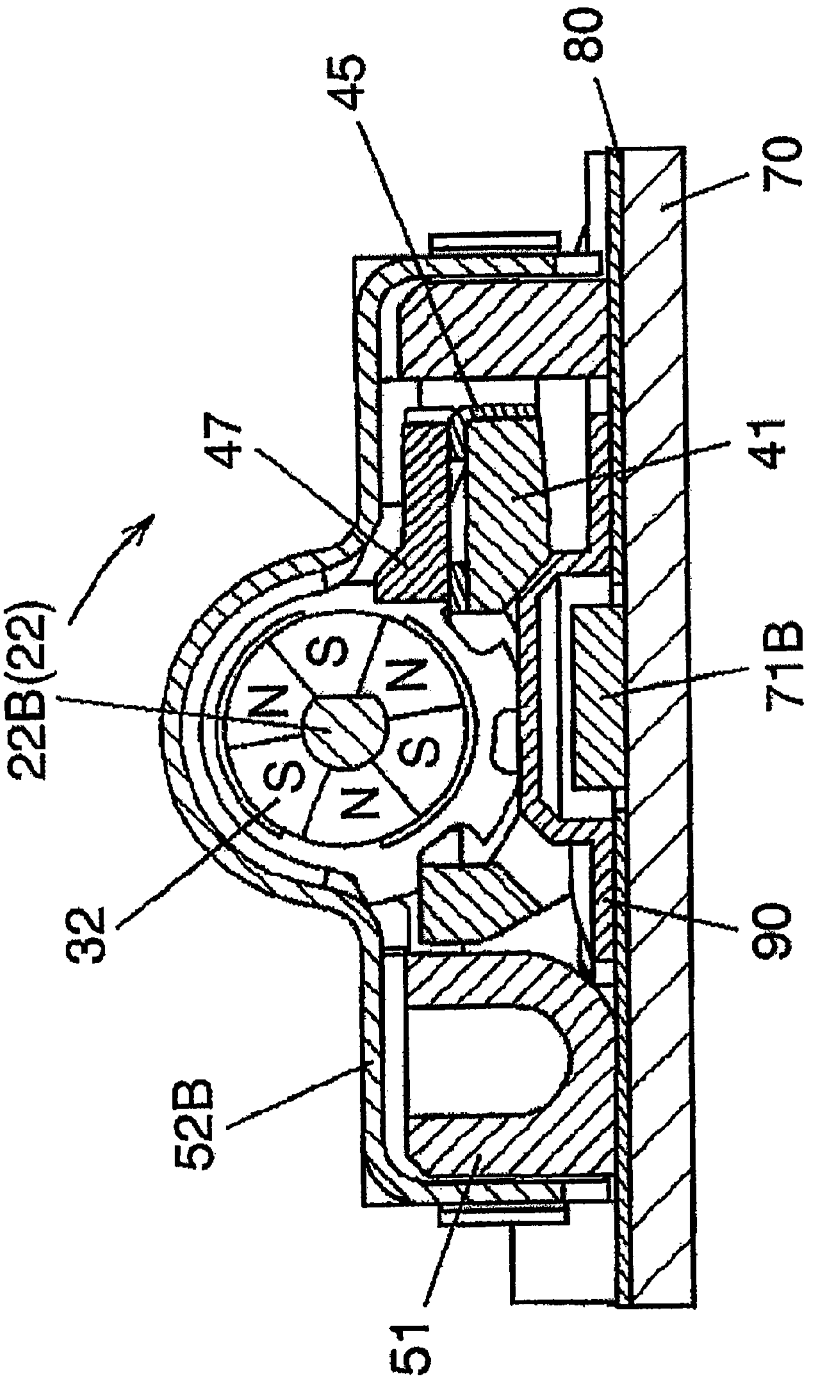
FIG. 10 is a side sectional view of the same in FIG. 3, taken along line D-D.

FIG. 1 is a sectional elevational view of a component for input operation according to the embodiment of the present invention. FIG. 2 is an external perspective view of the same. FIG. 3 is a top view of the same. FIG. 4 is an exploded perspective view of the same. FIG. 5 is a perspective view of the same, before the mechanism composing position and wiring substrate composing position are assembled into the component. FIG. 6 is perspective view of the state of FIG. 5, viewed from the bottom. FIG. 7 is a perspective view illustrating the mechanism composing position of the same. FIG. 8 is a side sectional view of the same in FIG. 3, taken along line B-B. FIG. 9 is a side sectional view of the same in FIG. 3, taken along line C-C. FIG. 10 is a side sectional view of the same in FIG. 3, taken along line D-D.

In FIGS. 1 through 10, roller-shaped operation part 21 is formed with such as resin into a roughly cylindrical shape. Through hole 21A formed at the central axis line of operation part 21 has central axis 22 inserted thereinto to be integrated with operation part 21.

Central axis 22 is composed of left-side axis portion 22A and right-side axis portion 22B. Left-side axis portion 22A is press-fitted into through hole 21A from its left side, and right-side axis portion 22B from its right side, where their tips are locked with each other inside operation part 21. Then, the protruded part of left-side axis portion 22A protruded from operation part 21 has left-side ring magnet 31 formed into a cylindrical shape, fixed thereto. The protruded part of right-side axis portion 22B has right-side ring magnet 32 formed into a cylindrical shape, fixed thereto. Left-side ring magnet 31 and right-side ring magnet 32 are magnetized to north and south poles alternately at a given uniform angular pitch and are respectively fixed coaxially with central axis 22, circumferentially displaced from each other by a certain angle.

In left-side axis portion 22A and right-side axis portion 22B press-fitted into operation part 21, the locked parts at their tips engaging with each other at the center of operation part 21 are respectively formed into a shape with a flat surface semicircular in cross section, parallel to the axis, where the flat surfaces are combined by locking when press-fitted and fixed. Further, the flat surfaces are formed so as to have steps in the radial direction, where each step is locked. This structure facilitates preliminarily fixing left-side ring magnet 31 and right-side ring magnet 32 to left-side axis portion 22A and right-side axis portion 22B, respectively, with reference to the flat surfaces combined when press-fitted as described above. Furthermore, only by press-fitting and fixing left-side axis portion 22A and right-side axis portion 22B into operation part 21, left-side ring magnet 31 and right-side ring magnet 32 are integrated with operation part 21 at a desired arrangement and angle, not depending largely on such as the press-fitting amount. Here, for a structure in which left-side ring magnet 31 and right-side ring magnet 32 are preliminarily fixed to left-side axis portion 22A and right-side axis portion 22B described above, respectively, a plastic magnet is outsert-molded to form left-side ring magnet 31 and right-side ring magnet 32 and to fix them to left-side axis portion 22A and the right-side axis portion 22B, respectively. Alternatively, resin may be outsert-molded into left-side ring magnet 31 and right-side ring magnet 32 contrarily.

In this way, operation part 21 is fixed to the central part of central axis 22, and left-side ring magnet 31 and right-side ring magnet 32 are fixed to the right and left positions, to compose a rotating member.

Each end of central axis 22 of the rotating member is formed into a cylindrical shape with a small diameter. Then, as a result that the ends are placed inside recess 41A formed into an open-topped U shape on the top ends of the side walls respectively corresponding to attaching member 41 formed into a rough rectangle, the rotating member is attached integrally and rotatably while being supported by attaching member 41.

Plate-like body 45 has left-side stationary magnet 46 and right-side stationary magnet 47 fixed thereto. Plate-like body 45 itself is fixed to attaching member 41 with a dowel provided in attaching member 41 crimped. Then, as shown in FIGS. 9, 10, left-side stationary magnet 46 and right-side stationary magnet 47 are arranged with the same proximal arrangement relative to left-side ring magnet 31 and right-side ring magnet 32, in a state where the rotating member is attached to attaching member 41. Here, left-side stationary magnet 46 and right-side stationary magnet 47 have the same magnetic pole.

Plate-like body 45 is formed with high magnetic permeability material, and thus the influence of magnetism is reduced on magnetism detection elements 71A, 71B (described later) arranged below left-side stationary magnet 46 and right-side stationary magnet 47 arranged on the top surface of body 45. Here, if a plastic magnet, for example, is outsert-molded to fix and to form left-side stationary magnet 46 and right-side stationary magnet 47, they are produced inexpensively.

Attaching member 41 has axis-like rotation supporting point 41B at the front thereof. Rotation retaining groove B is provided at the front of base 51 formed with resin into a roughly frame-like shape. Then, rotation supporting point 41B is engaged with rotation retaining groove 51B and combined so that a rotation action can be made where the back side of attaching member 41 moves down relatively to base 51 with rotation supporting point 41B as a supporting point.

Covers 51A are provided on the longitudinal sides of base 51, respectively, and cover both top ends of axis 22 arranged inside recess 41A, thereby preventing central axis 22 from slipping off upward. Further, base 51 has switch pressing members 52A, 52B attached thereto so as to protrude longitudinally outward. Switch pressing members 52A, 52B are rotatably attached to base 51 so that the outward end side of the longitudinal side of base 51 moves down.

The parts with the above-described structure, composing the mechanism of the component for input operation, are used combined with magnetism detection elements 71A, 71B and press switches 75, 76, 77, which are all provided on wiring substrate 70.

Magnetism detection elements 71A, 71B are implemented on the upper surface of wiring substrate 70 each correspondingly to respective downward positions of left-side ring magnet 31 and right-side ring magnet 32. Press switches 75, 76, 77 include fixed contacts 75A, 76A, 77A arranged on wiring substrate 70; and insulating sheet 80 with movable contacts (not shown) respectively corresponding to switches 75, 76, 77, arranged on the bottom surface thereof. Insulating sheet 80 is bonded onto wiring substrate 70.

When attaching member 41 makes a rotation action where its back side moves down relatively to base 51, press switch 75 centrally positioned is pressed at its bottom surface. Press switches 76, 77 are pressed when switch pressing members 52A, 52B rotate.

Rubber sheet 90 is arranged between insulating sheet 80 and attaching member 41 to improve dust resistance and drip-proofness. The parts composing the mechanism of the component for input operation are placed on rubber sheet 90; positioned; and fixed to wiring substrate 70 with such as screws (not shown). The bottom surface of attaching member 41 corresponding to the position of press switch 75, and the outward tip of switch pressing members 52A, 52B touch rubber sheet 90.

As described above, in the component for input operation according to the embodiment of the present invention, magnetism detection elements 71A, 71B are arranged below the parts composing the mechanism of the component for input operation. Accordingly, press switches 76, 77 can be provided laterally at the longitudinal side of the parts, thereby diversifying operation patterns.

Next, a description is made for the operation of the component for input operation according to the embodiment.

While operation part 21 of the component for input operation is not being operated, the attractive forces between left-side stationary magnet 46 and left-side ring magnet 31, and between right-side stationary magnet 47 and right-side ring magnet 32 equilibrate, and the rotating member is at a stop. Here, left-side ring magnet 31 and right-side ring magnet 32 are arranged displaced from each other by a certain angle. As shown in FIGS. 9, 10, left-side ring magnet 31 and right-side ring magnet 32 are set so that both magnetic poles different from those of left-side stationary magnet 46 and right-side stationary magnet 47 are in an attractive state, and attraction is made at different circumferential angular positions at the ends between right and left, in the above-described stopped state. With this setting, the rotating member in a non-operational state maintains a stable stopped state. Here, to enter the above-described state, it is important to properly set the angle of each magnetic pole of left-side ring magnet 31 and right-side ring magnet 32, and to set such as the shape and position of left-side stationary magnet 46 and left-side stationary magnet 47.

Rotating operation by exerting a tangential force on the outer circumferential surface of operation part 21 causes the rotating member to rotate integrally. In response to the rotation of left-side ring magnet 31 and right-side ring magnet 32, magnetic variation occurs. The variation is detected by magnetism detection elements 71A, 71B below, each giving a predetermined pulse signal. With such a structure, magnetism detection elements 71A, 71B can be arranged displaced from each other, in addition to a fixed angle displaced between left-side ring magnet 31 and right-side ring magnet 32 relatively to operation part 21. Thus, a pulse signal with a desired phase difference is easily gained, thereby enabling the rotation amount and rotation direction of operation part 21 to be detected accurately. Here, the following structure may be used. That is, left-side ring magnet 31 and right-side ring magnet 32 are arranged without being displaced, and only magnetism detection elements 71A, 71B are arranged displaced to gain output of a required phase difference.

During the above-described rotating operation, left-side ring magnet 31 is close to left-side stationary magnet 46, and right-side ring magnet 32 rotates close to right-side stationary magnet 47, thus attractive and repulsive forces occur between each pair of the magnets.

Figure 11:
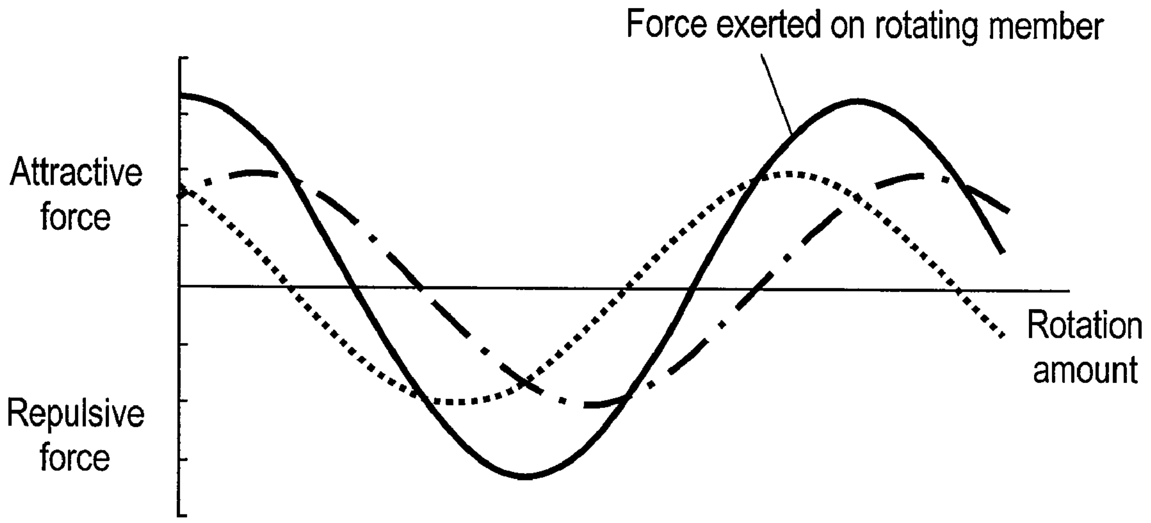
FIG. 11 shows the transition of forces during rotating operation of the operation part of the same.
Figure 12:
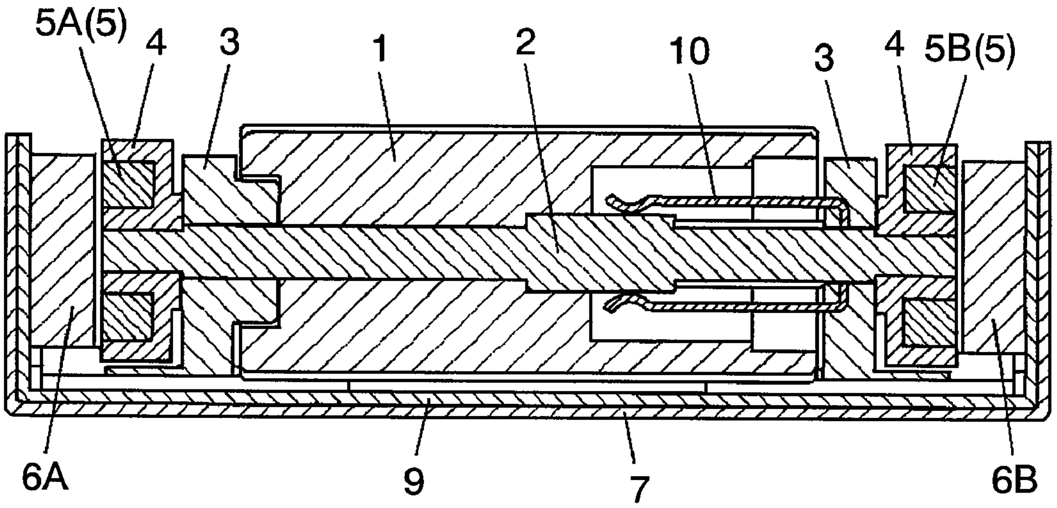
FIG. 12 PRIOR ART
FIG. 12 is a sectional elevational view of a conventional component for input operation.
Figure 13:
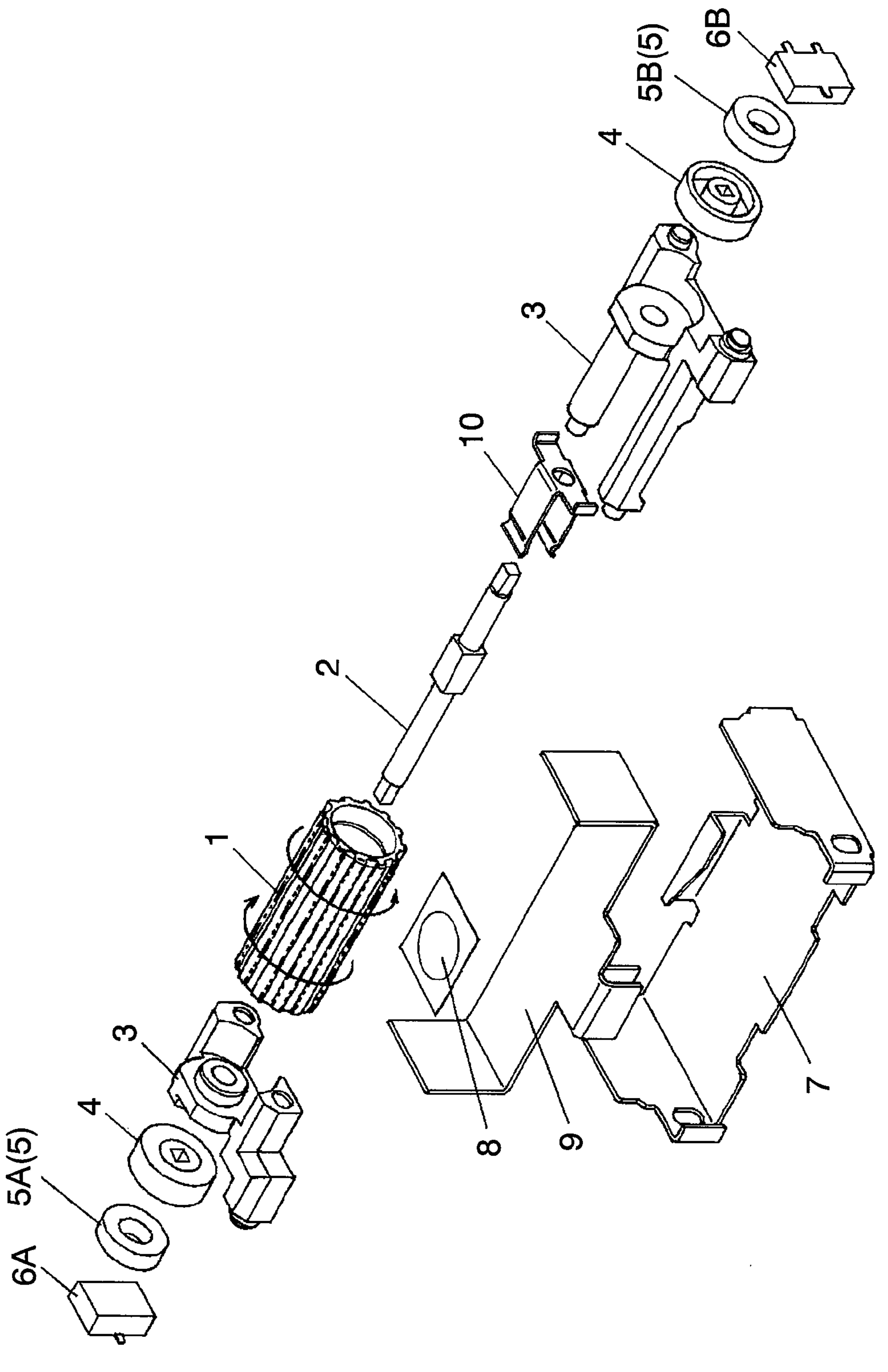
FIG. 13 PRIOR ART
FIG. 13 is an exploded perspective view of the conventional component for input operation.
Figure 14:
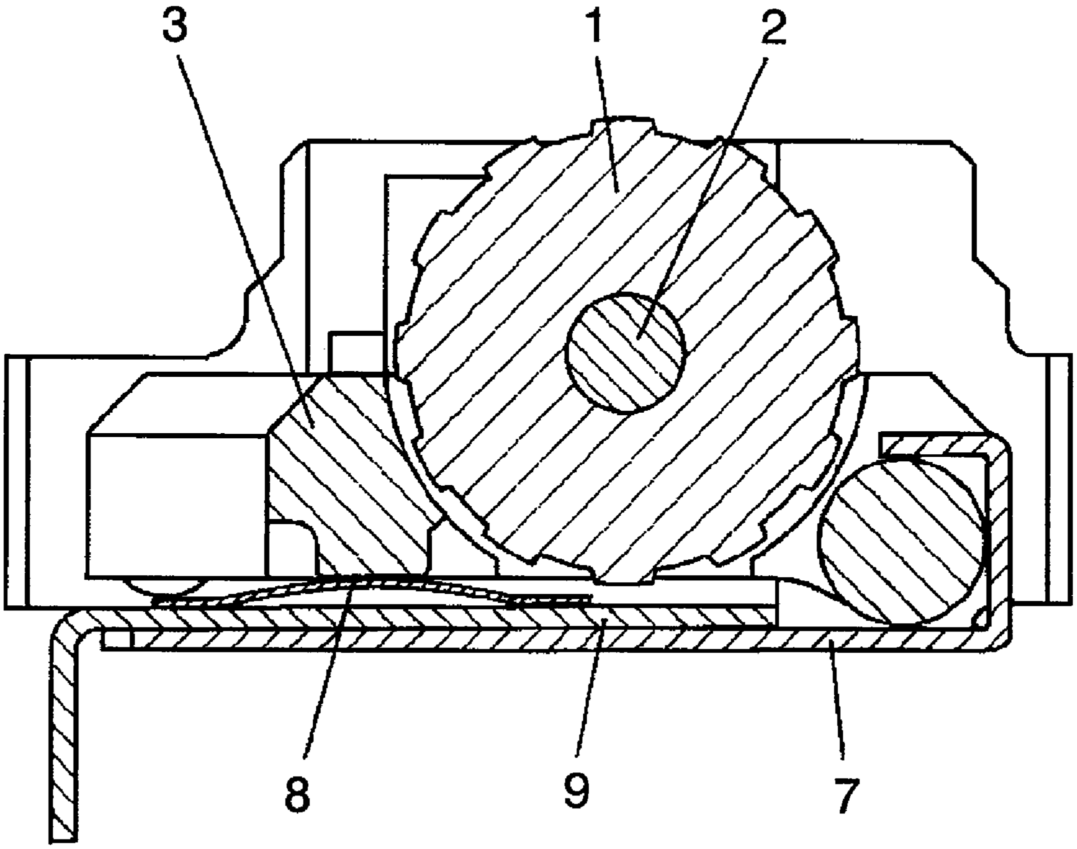
FIG. 14 PRIOR ART
FIG. 14 is a side sectional view of the same.

FIG. 11 shows the transition of forces during the rotating operation of the operation part of the component for input operation according to the embodiment of the present invention. In FIG. 11, the horizontal axis indicates rotation amount; and the vertical axis, attractive and repulsive forces. The broken line shows the transition of force between a pair of the magnets on the left, and the dashed-dotted line, that on the right.

At this moment, in the component for input operation according to the embodiment, left-side stationary magnet 46 and right-side stationary magnet 47 have the same magnetic pole; each is arranged close to corresponding left-side ring magnet 31 and right-side ring magnet 32 respectively at the same distance; and additionally left-side ring magnet 31 and right-side ring magnet 32 are arranged displaced circumferentially from each other by a given angle. Accordingly, forces between each pair of the magnets occur involving the difference equivalent to the angle of left-side ring magnet 31 and right-side ring magnet 32 circumferentially displaced. Then, the above-described two attractive and repulsive forces totally act on the rotating member including the above-described operation part 21, left-side ring magnet 31, and right-side ring magnet 32 integrally, resulting in the force shown by the solid line in FIG. 11 repeatedly exerted on the rotating member.

The force actually exerted on this rotating member becomes alternately stronger and weaker, thereby creating a click touch, as FIG. 11 proves.

As described above, by means of left-side ring magnet 31 and right-side ring magnet 32 for detecting a rotating state, arranged so that a stopped state of operation part 21 can be maintained; and by means of left-side stationary magnet 46 and right-side ring magnet 47 arranged correspondingly to magnets 31, 32, respectively, two attractive and repulsive forces gained during the rotation of the rotating member are totally exerted on the rotating member, which is felt as a click touch. The forces are exerted in a noncontact manner, not using such as an elastic force of a spring as in a conventional way. Consequently, a sharp, clear click touch with less lingering touch is available.

Next, exerting a downward pressing force on operation part 21 causes attaching member 41 supporting the rotating member to rotate so that its reaerward side moves down relatively to base 51. This rotation causes press switch 75 to be pressed through rubber sheet 90, giving its switching signal. Removing the pressing force causes attaching member 41 to counterrotate to be pressed back to its original position due to self restoration of press switch 75.

When switch pressing member 52A (52B) laterally arranged is pressed down, it rotates relatively to base 51 so that its outward side moves down. This rotation causes press switch 76 (77) to be pressed through rubber sheet 90, giving its switching signal. Removing the pressing force causes switch pressing member 52A (52B) to counterrotate to be pressed back to its original position due to self restoration of press switch 76 (77).

As described above, in the component for input operation according to the embodiment, two attractive and repulsive forces generated in a noncontact manner between left-side ring magnet 31 arranged to detect a rotating state and left-side stationary magnet 46 arranged correspondingly to magnet 31; and between right-side ring magnet 32 arranged to detect a rotating state and right-side stationary magnet 47 arranged correspondingly to magnet 32 provide a click touch during the rotating operation of operation part 21. Consequently, the life for rotating operation can be prolonged compared to a conventional component.

Here, if left-side ring magnet 31 and right-side ring magnet 32 arranged to detect a rotating state are fixed displaced from each other by a given angle as described above, output of a desired phase difference is gained even if magnetism detection elements 71A, 71B are arranged without being displaced significantly, which is preferably space-saving. Meanwhile, if left-side ring magnet 31 and right-side ring magnet 32 are fixed without being displaced angularly, magnetism detection elements 71A, 71B need to be arranged displaced by an angle larger the above, to gain output of a desired phase difference. In this case, a click touch strongest, sharp, and clear is gained in a noncontact manner.

A component for input operation according to the present invention provides a sharp, clear click touch during rotating operation, with an additional advantage of prolonging the life, which is useful when composing a unit for input operation for various types of electronic devices.

The invention claimed is:

1. A component for input operation, comprising:

a roller-shaped operation part;

two cylindrical ring magnets including a first cylindrical ring magnet and a second cylindrical ring magnet magnetized such that each of the two cylindrical ring magnets has a plurality of north poles and south poles arranged in a circular pattern at a given angular pitch, each of the north poles arranged adjacent to respective one of the south poles, the first cylindrical ring magnet being arranged at a left side of the roller-shaped operation part and the second cylindrical ring magnet being arranged at a right side of the roller-shaped operation part, the cylindrical ring magnets and the roller-shaped operation part being coaxially arranged so that each pole of the plurality of north poles of the first cylindrical ring magnet are displaced circumferentially from each pole of the plurality of north poles of the second cylindrical ring magnet and so that each pole of the plurality of south poles of the first cylindrical ring magnet are displaced circumferentially from each pole of the plurality of south poles of the second cylindrical ring magnet; and magnetism detection elements arranged correspondingly to the ring magnets, respectively, wherein the component further includes stationary magnets arranged correspondingly to the ring magnets, respectively, to thereby create a first pair including one of the ring magnets and one of the stationary magnets and a second pair including another of the ring magnets and another of the stationary magnets;

wherein attractive and repulsive force occurring between the first pair and attractive and repulsive force occurring between the second pair are totaled during partial rotation of the operation part to provide a click touch for the operation part;

wherein the stationary magnets are fixed to a plate-like body made of high magnetic permeability material; and wherein the plate-like body with the stationary magnets fixed thereto is arranged so that magnetism from the stationary magnets, toward a position where the magnetism detection elements are arranged is blocked by the plate-like body.

2. The component for input operation of claim 1, wherein the roller shaped operation part includes a left-side axis portion and a right-side axis portion, wherein the first cylindrical ring magnet is fixed to the left-side axis portion and the second cylindrical magnet is fixed to the right-side axis portion, and wherein the first cylindrical ring magnet and the second cylindrical ring magnet are fixed to the operation part by pressing the left-side axis portion and right-side axis portion into a through hole formed in a center of the operation part.

* * * * *